(12) United States Patent
Kozina et al.

(10) Patent No.: US 7,942,174 B2
(45) Date of Patent: May 17, 2011

(54) FEATHER BOARD APPARATUS AND METHOD

(75) Inventors: Damian A. Kozina, Chicago, IL (US); Edward D. Adkins, Machesney Park, IL (US)

(73) Assignee: Nomis LLC, Hampshire, IL (US)

( * ) Notice: Subject to any disclaimer, the term of this patent is extended or adjusted under 35 U.S.C. 154(b) by 213 days.

(21) Appl. No.: 12/116,469

(22) Filed: May 7, 2008

(65) Prior Publication Data
US 2008/0277024 A1 Nov. 13, 2008

Related U.S. Application Data

(60) Provisional application No. 60/916,533, filed on May 7, 2007.

(51) Int. Cl.
*B27C 1/12* (2006.01)
*B27B 31/00* (2006.01)
(52) U.S. Cl. ........................................ 144/253.6; 83/449
(58) Field of Classification Search .............. 144/253.1, 144/253.6, 253.7; 83/446, 449; D08/300, D08/315
See application file for complete search history.

(56) References Cited

U.S. PATENT DOCUMENTS

| 4,476,757 | A | * | 10/1984 | Morris | 83/446 |
| 5,000,237 | A | * | 3/1991 | Berkeley et al. | 144/251.3 |
| 6,718,857 | B2 | * | 4/2004 | Kimmel et al. | 83/447 |
| 6,968,766 | B2 | * | 11/2005 | Kimmel et al. | 83/447 |
| 7,017,464 | B2 | * | 3/2006 | Coderre | 83/446 |
| 2003/0140754 | A1 | * | 7/2003 | Kimmel et al. | 83/447 |
| 2006/0191596 | A1 | | 8/2006 | Fontaine | |
| 2008/0277024 | A1 | * | 11/2008 | Kozina et al. | 144/253.6 |

\* cited by examiner

*Primary Examiner* — Shelley Self
(74) *Attorney, Agent, or Firm* — Reinhart Boerner Van Deuren P.C.

(57) ABSTRACT

An improved feather board apparatus and method are provided, for use in holding a work piece against a guide surface as the work piece is guided in a feed direction, and for precluding motion of the work piece in a direction opposite the feed direction, through use of a feather board apparatus, having a feather board clamping arrangement which allows for limited amount of pivoting of the feather board about an in feed side clamping point, as the work piece is fed past the feather board.

21 Claims, 9 Drawing Sheets

FEATHER BOARD APPARATUS AND METHOD

CROSS-REFERENCE TO RELATED PATENT APPLICATIONS

This patent application claims the benefit of U.S. Provisional Patent Application No. 60/916,533, filed May 7, 2007, the disclosure and teachings of which are incorporated herein, in their entireties, by reference.

FIELD OF THE INVENTION

This invention relates to machines and tools for cutting materials, such as wood, and more particularly to fixtures such as feather boards for clamping a work piece against a guide surface, as the work piece is moved past a cutting tool, for maintaining a desired position of the work piece and/or precluding kick-back of the work piece.

BACKGROUND OF THE INVENTION

Feather boards have been used for decades to hold a work piece against a guide surface, as the work piece was guided in a feed direction to a cutting tool. Such feather boards traditionally have a series of fingers extending from one edge thereof, positioned adjacent to the guide surface but spaced a clearance distance therefrom, so that the work piece may be fed between the fingers of the feather board and the guide surface. The feather board is initially positioned closely enough to the guide surface, and the fingers of the feather board are typically designed to extend at an angle to the guide surface, in such a manner that as the work piece is fed through the clearance between the feather board and the guide, the fingers are deflected slightly and exert a sideways pressure to hold the work piece against the guide. The fingers are typically attached to a body of the feather board at a point closer to the infeed end of the guide surface, with the remainder of the fingers extending at an angle in the feed direction and terminating at a plurality of distal ends which in combination define a contact surface of the feather board. Because the fingers are angled in this fashion, should the cutting tool catch the work piece and try to kick it backward toward the infeed end of the guide surface, the fingers of the feather board will be energized into the surface of the work piece and preclude the kick-back of the work piece that would otherwise occur.

Although there have been many prior attempts to designing feather boards, additional improvement is still desirable in a number of areas. For example, a common problem encountered while using feather boards is that, if the feather board is not very precisely positioned, with respect to the guide surface, the pushing force required to feed the work piece along the guide surface, against the friction generated by contact of the work piece with the distal ends of the fingers on the feather board becomes so great, part way through the operation of feeding the work piece past the cutting tool, that the work piece cannot be moved further. It would be desirable, therefore, to provide a feather board apparatus and method allowing the clamping force exerted by the feather board to self-adjust, to a limited extent, as the work piece is fed past the feather board, so that the force required to continue feeding the work piece never becomes excessive. Such a solution would be preferable as compared to other potential solutions involving very accurate measurements being required in the placement of the feather board with respect to the guide surface.

Another area in which improvement is desirable in the art of the configuration and use of feather boards, is to provide a convenience apparatus and method for utilizing feather boards for guiding and preventing kick-back with work pieces that are fairly tall, in situations, for example, such as cutting a rabbet groove along the side of a bookcase or other tall piece of furniture.

Where feather boards, or other types of attachments or adjustments on tools must be made, prior experience has shown that adjustment or locking knobs, of conventional construction, are often difficult to loosen once they have been tightened. It would be desirable, therefore, to provide an improved knob configuration which would preferentially be more difficult to tighten than to loosen, to preclude the problem of having the knob which was originally tightened by hand be too tight to be loosened by hand.

What is needed, therefore, is an improved feather board apparatus and method, addressing one or more of the problems described above, and/or other problems encountered in the use of prior feather board arrangements as are well know to those having skill in the art.

BRIEF SUMMARY OF THE INVENTION

The invention provides an improved feather board apparatus and method for use in holding a work piece against a guide surface as the work piece is guided in a feed direction, and for precluding motion of the work piece in a direction opposite the feed direction, through use of a feather board apparatus having a feather board clamping arrangement which allows for a limited amount of pivoting of the feather board about an infeed side clamping point, as the work piece is fed past the feather board.

In one form of the invention, a feather board apparatus includes a feather board body, an infeed side feather board clamping arrangement, and an outfeed side feather board clamping arrangement.

The feather board body defines first and second faces thereof, a longitudinal axis thereof, infeed and outfeed sides thereof disposed on opposite sides of the longitudinal axis, and a transverse edge thereof connecting the first and second faces and extending substantially perpendicularly to the longitudinal axis. The feather board body also defines a plurality of fingers extending at an angle from the transverse edge, with each finger having a distal end thereof configured for sliding contact with the work piece. The distal ends of the plurality of fingers are each adapted for contacting and defining a contact plane of the feather board, which extends substantially along the feed direction and is spaced a clearance distance from the guide surface when the feather board is mounted adjacent the guide surface.

The infeed side feather board clamping arrangement is configured for applying an infeed side clamping force at an infeed side clamp point for retaining the infeed side of the feather board at the clearance distance from the guide surface. In similar fashion, the outfeed side feather board clamping arrangement is configured for applying an outfeed side clamping force to an outfeed side clamp point, for retaining the outfeed side of the feather board at the clearance distance from the guide surface.

The infeed side and outfeed side feather board clamping arrangements are cooperatively configured for limiting the outfeed side clamping pressure to a value that is lower than the infeed side pressure, to provide a limited amount of slippage at the outfeed clamping point as the work piece is fed through the clearance between the contact plane of the feather board and the guide surface. Because only the outfeed side clamping point is allowed to slip, the feather board pivots a limited angular distance about the infeed side clamping point, after the frictional force generated by the distal ends of the fingers of the feather board along the outfeed side of the feather board exceed a threshold value. This limited pivoting motion results in the overall pushing force required to move the work piece further past the feather board along the guide surface being reduced in such a manner that it does not become excessive.

In some forms of the invention, the feather board defines a pair of slots extending therethrough from the first to the second faces of the bodies. One of the slots is disposed on the infeed side and forms part of the infeed clamping arrangement, and the other slot is disposed on the outfeed side of the longitudinal axis and forms part of the outfeed side feather board clamping arrangement. The infeed and outfeed side clamping arrangements each include a respective clamping bolt extending through the slot and threadably engaging a respective infeed and outfeed clamping knob, for converting a torque applied to the knob to the infeed or outfeed clamping pressure exerted at the infeed and outfeed clamping points.

The infeed side slot has a mating surface thereof adapted for receiving clamping pressure from the infeed knob, and the outfeed side slot has a mating surface thereof adapted for receiving clamping pressure from the outfeed knob. The mating surface of the infeed side slot has a smaller area of operative contact with the infeed knob than an area of operative contact between the mating surface of the outfeed side slot and the outfeed knob. By virtue of the difference in contact area, for the same clamping force being applied to both the infeed and outfeed clamping bolts, a higher contact pressure will be exerted at the infeed contact point than is exerted at the outfeed contact point. As a result, particularly in embodiments of the invention having a feather board body formed from a material which is somewhat compressible and exerting a relatively low co-efficient of friction, such as various types of polymer or plastic materials for example, the contact pressure at the infeed clamping point will tend to slightly deform the material of the body of the feather board, in such a manner that the feather board is substantially restrained to pivot about the infeed clamping point, whereas the material adjacent the outfeed clamping point will be less tightly clamped and will tend to allow for a limited slipping motion of the surface of the feather board at the outfeed side clamping point.

In some forms of the invention, the surface of the feather board adjacent the infeed side slot may have a somewhat concave shaped cross-section, to provide a reduced operative contact area. Some forms of the invention may also include intermediate elements, such as washers disposed between the knob and the surface of the body of the feather board, with the overall operative difference in contact areas between the infeed and outfeed clamping points still being maintained by the infeed and outfeed clamping arrangements, in accordance with the invention.

In some forms of the invention, the knobs may have an S-shaped periphery which is slightly more difficult to grasp in a tightening direction than in an untightening direction. By virtue of this arrangement, the knobs typically cannot be tightened by hand to such a degree that they cannot be also loosened by hand.

Some forms of the invention may also include a second feather board, according to the invention, adapted to be mounted on top of a first feather board, according to the invention, to thereby provide a stacked configuration of the two feather boards for use with a taller work piece along the guide surface. Some forms of the invention may also include a spacer configured to be sandwiched between the first and second feather boards.

Some forms of the invention may also include a slot bar, which is adapted for engagement with the clamping bolts and for being received in a guide slot running substantially parallel to the guide surface. The slot bar, at the infeed clamping point, may include a tapered clamping surface thereof, disposed about a corresponding tapered portion of the clamping bolt at the infeed clamping point, such that as the clamping bolt is placed in tension by the knob, the conical surfaces interact with one another to expand the slot bar adjacent the infeed clamping point to wedge the slot bar into the guide slot. Some forms of the invention may include two or more slot bars, each having a different width, for use of the invention with a variety of shaping machines having guide slots of differing widths. For example, a typical table saw has a guide slot width of ¾ of an inch, whereas the guide slot in a typical router table may be only ⅝ of an inch.

The invention may also be practiced in the form of a method for making, using, or marketing a feather board apparatus, according to the invention.

Other aspects, objects and advantages of the invention will be apparent from the following and attached detailed description and drawings of exemplary embodiments.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
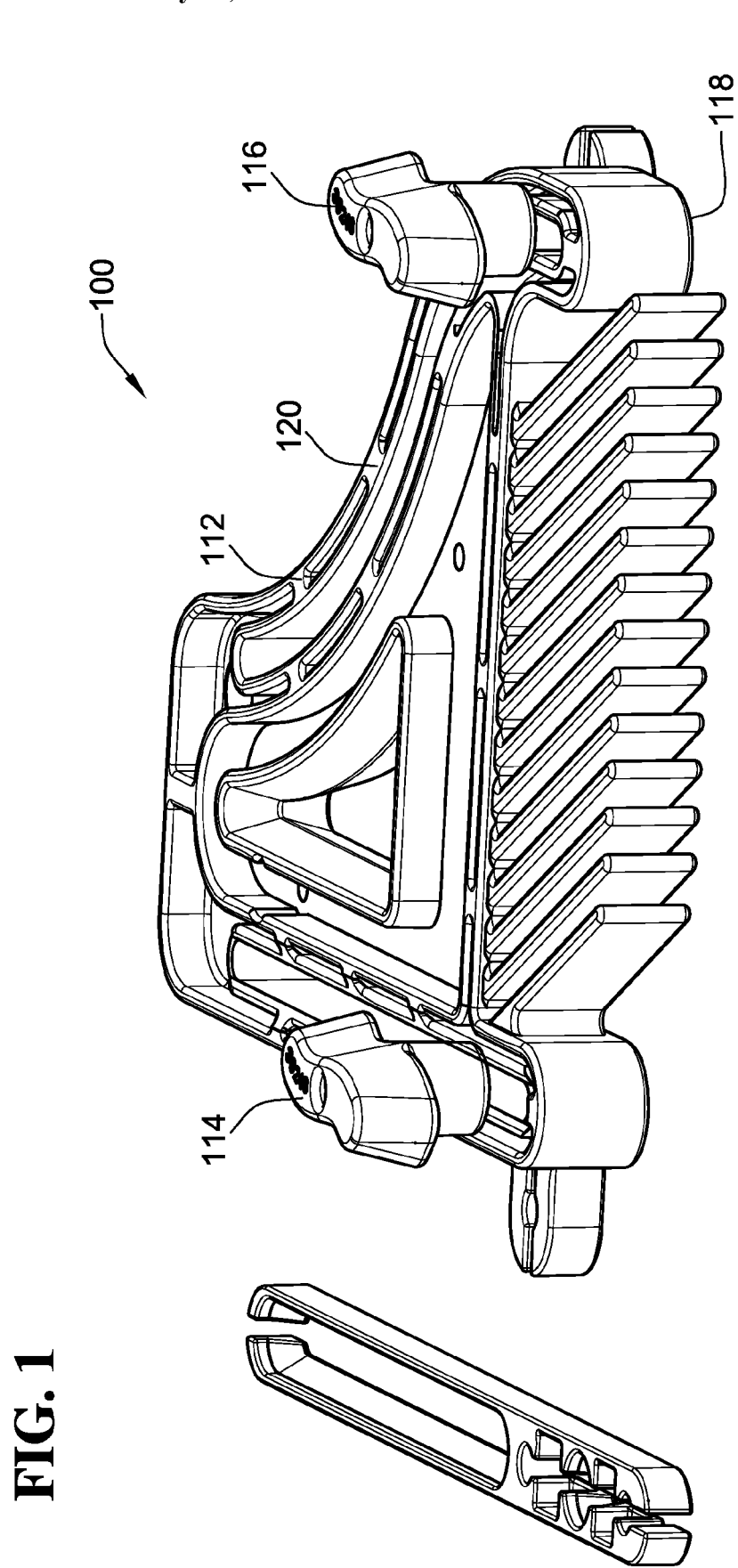
FIG. 1 is a perspective illustration of a first exemplary embodiment of a feather board apparatus, according to the invention, including a single feather board.
Figure 11:
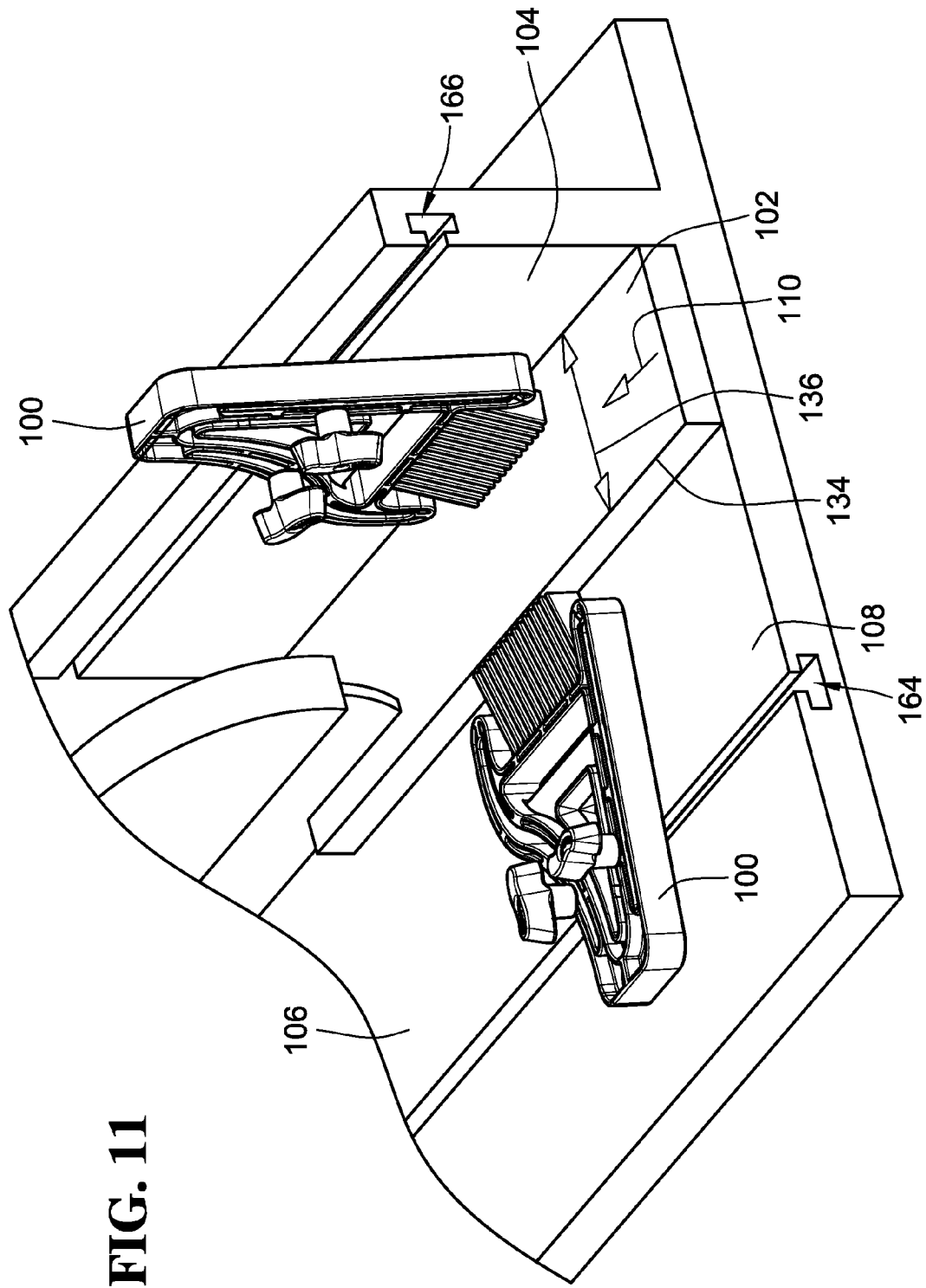
FIG. 11 is a perspective illustration showing an exemplary embodiment of a method for using a pair of feather board apparatuses of the type shown in FIGS. 1-6 for securing a work piece against the table and a guide surface extending from the table of a machine, as the work piece is guided through the machine in a feed direction.

FIG. 1 shows a first exemplary embodiment of a feather board apparatus 100, according to the invention, for holding a work piece 102 against a guide surface 104 of a machine 106, in the manner shown in FIG. 11, as the work piece 102 is guided across a table 108 of the machine 106 in a feed direction indicated by arrow 110. As shown in FIG. 1, the first exemplary embodiment of the feather board apparatus includes a feather board body 112, an infeed side feather board clamping arrangement 114 and an outfeed side feather board clamping arrangement 116.

Figure 2:
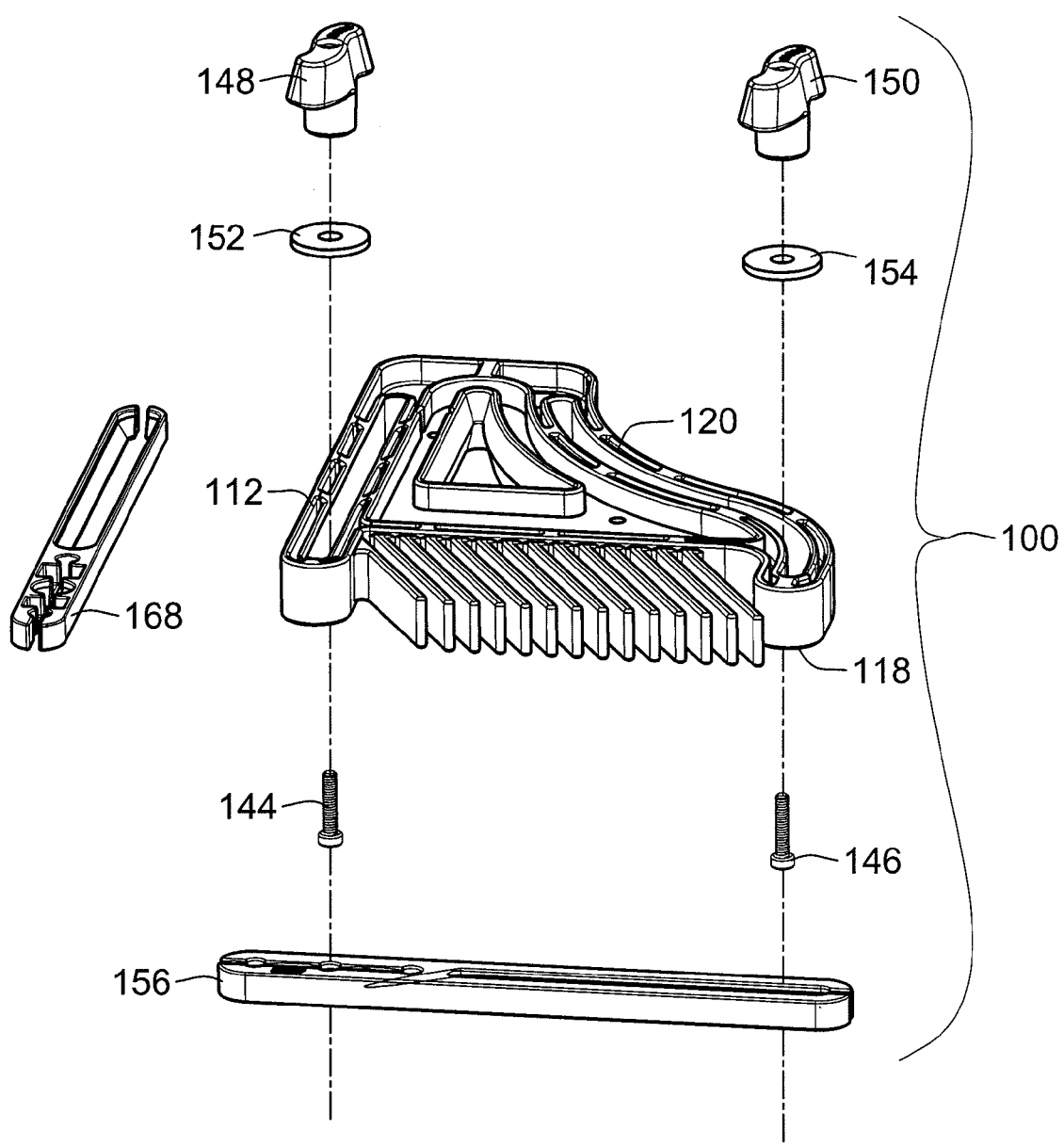
FIG. 2 is an exploded perspective illustration of the first exemplary embodiment of the feather board apparatus shown in FIG. 1.
Figure 3:
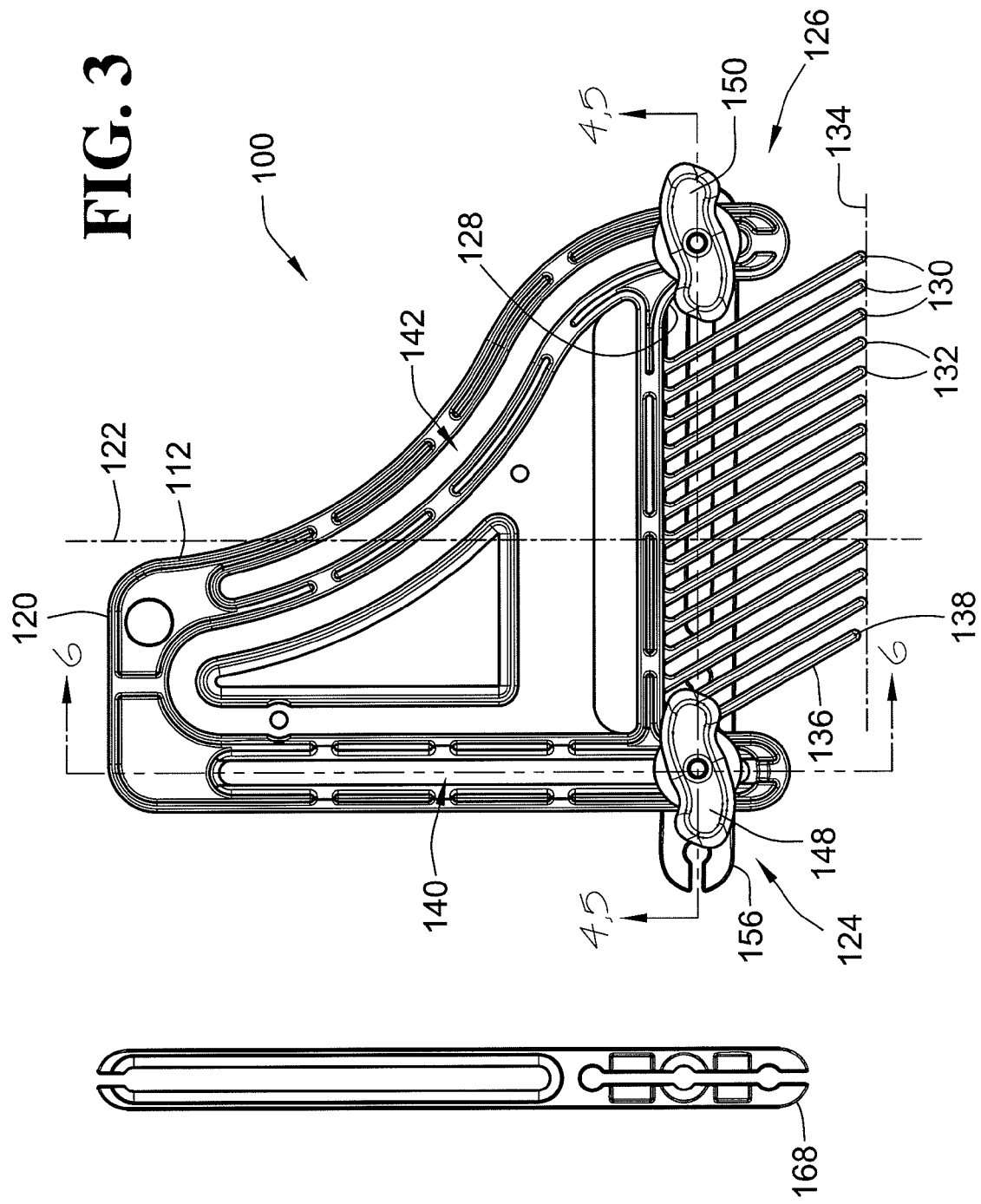
FIG. 3 is a top view of the feather board apparatus of FIGS. 1 and 2, illustrating section lines applicable to FIGS. 4-6.

As shown in FIGS. 2 and 3, the feather board body 112 defines first and second faces 118, 120 thereof (corresponding to a lower and an upper surface as shown in FIGS. 1-3). As best seen in FIG. 3, the feather board body 112 also defines a longitudinal axis 122 of the feather board body 112 infeed and outfeed sides 124, 126 disposed on opposite sides of the longitudinal axis 122, and a transverse edge 128 connecting the first and second faces 118, 120 of the feather board body 112 and extending substantially perpendicularly to the longitudinal axis 122.

As further best seen in FIG. 3, the feather board body 112 also defines a plurality of fingers 130 extending at an angle from the transverse 128, with each finger 130 having a distal end 132 thereof configured for sliding contact with the work piece 102. The distal ends 132 of the plurality of fingers 130 are adapted for contacting and defining a contact plane, illustrated by dashed line 134 in FIG. 3, of the feather board 100.

As shown in FIG. 11, when the feather board apparatus 100 is mounted adjacent the guide surface 104 on the table 108 of the machine 106, the clamping plane 134 of the feather board 100 extends substantially along the feed direction 110 and is spaced from the guide surface 104 at a clearance distance 136 from the guide surface 104 to form a desired clearance between the clamping plane 134 and the guide surface 104.

As shown in FIG. 3, a first finger 136, adjacent the infeed side 124 of the feather board body 112 has an angled length which is slightly shorter than the remainder of the fingers 130, such that a distal end 138 of the first finger 136 is positioned just short of the clamping plane 134. This arrangement provides a guiding feature to facilitate pushing the end of the work piece 110 into the clearance space 136 between the clamping plane 134 and the guide surface 104. In various embodiments of the invention, this shortened first finger may be omitted, or several more of the fingers most closely adjacent the infeed end 124 of the feather board body 112 may also be shortened to facilitate insertion of the work piece 110, when the feather board apparatus 100 is mounted adjacent the guide surface 104.

As shown in FIG. 3, the body 112 of the feather board apparatus 100 defines a pair of slots 140, 142 extending through the feather board body 112 from the first to the second faces 118, 120 of the body 112, with a first slot 140 disposed on the infeed side 124 of the body 112 and forming part of the infeed side clamping arrangement 114, and the second slot 142 being disposed on the outfeed side 126 of the feather board body 112 and forming part of the outfeed side feather board clamping arrangement 116.

Figure 4:
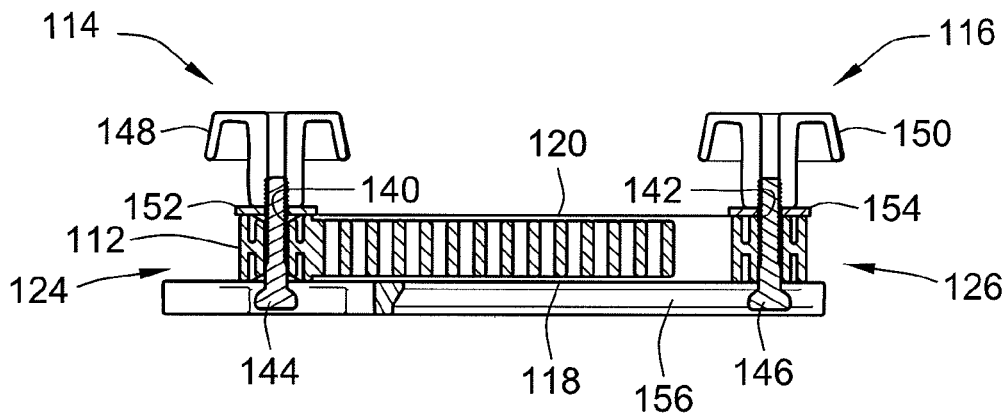
FIG. 4 is a cross-sectional view of the exemplary embodiment of the feather board apparatus of FIGS. 1-3, taken along line 4-4, as shown in FIG. 3.

As shown in FIGS. 2 and 4, the infeed and outfeed side clamping arrangements 112, 114 each include a respective clamping bolt 144, 146 extending through the slots 140, 142 and threadably engaging a respective infeed and outfeed clamping knob 148, 150 for converting torque applied to the knobs 148, 150, to infeed or outfeed clamping pressure exerted across the feather board body 112 at infeed and outfeed clamping points located under the infeed and outfeed clamping knobs 148, 150.

As further shown in FIGS. 2 and 4, the infeed and outfeed side clamping arrangements 112, 114 also include a pair of flat washers 152, 154 disposed between the knobs 148, 150 and the upper surface 120 of the feather board body 112. The infeed and outfeed side clamping arrangements 112, 114 also share a common slot bar 156 which is adapted for receiving heads of the infeed and outfeed clamping bolts 144, 146 and bearing against the bottom surface 118 of the feather board body 112, when the knobs 148 and 150 are tightened.

Figure 6:
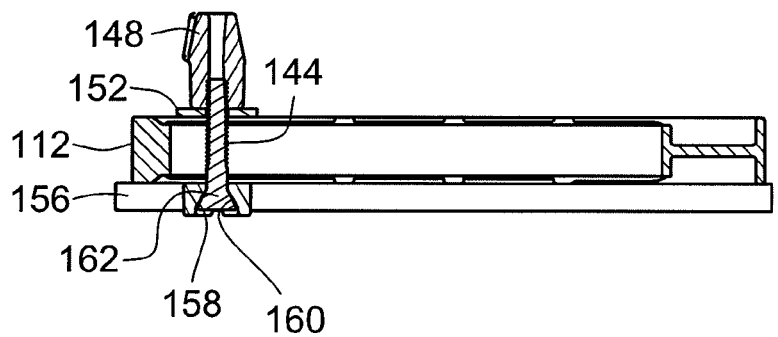
FIG. 6 is a sectional view, taken along line 6-6, of the feather board apparatus shown in FIG. 3.

As shown in FIG. 6, the slot bar 156 has a pair of lengthwise slots therein having tapered side walls 158 which are configured to mate with tapered side walls 160 on the head 162 of the bolt 144. By virtue of the interaction of the tapered side walls 158, 160 on the slot in the slot bar 156 and the head 162 of the bolt 144, as the knob 148 is tightened, the sides of the slot bar 156 expand outward and grip the sides of a slot 164 in the table 106, or a slot 166 in the guide surface 104 (see FIG. 11) to thereby hold the feather board apparatus 100 in place along the feed direction 110.

As indicated in FIGS. 2 and 3, the first exemplary embodiment of a feather board apparatus 100 may also include one or more additional slot bars 168 having differing widths for use with machines or guide surfaces having narrower or wider slots 164, 166. As further indicated in FIG. 2, in some embodiments of a feather board apparatus 100, according to the invention, the slot bars 156, 168 may also be configured for utilization with clamping bolts having a rectangular head, rather than the tapered head 160 described above. In such embodiments, the interaction between the head of the clamping bolts and the slot bars does not cause the slot bars 156, 168 to expand outward and grip the side walls of the slots 164, 166 in the table and/or support surface in the manner described above, such that the feather board can be slide along the length of the slots 164, 166 in applications where such sliding movement of the feather board 100 is desirable.

Figure 5:
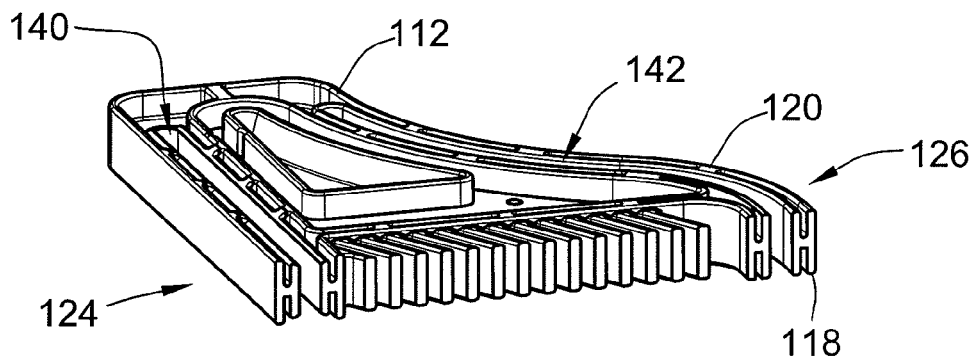
FIG. 5 is a perspective sectional view taken along line 5-5, of FIG. 3, showing details of the configuration of a feather board body of the feather board apparatus of FIGS. 1-4.
Figure 7:
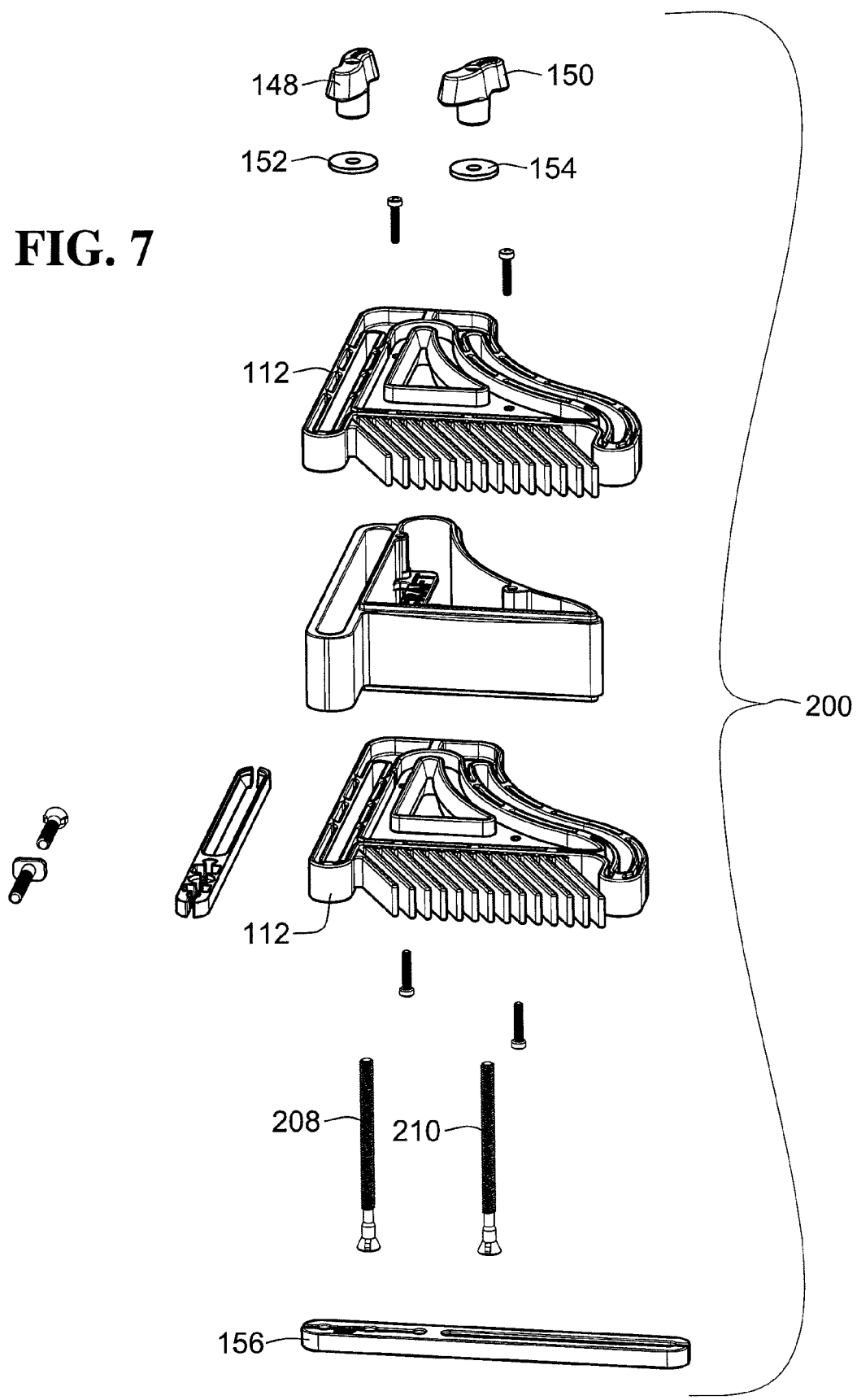
FIGS. 7-10 are perspective illustrations of a second exemplary embodiment of the invention, in the form of a feather board apparatus having a pair of feather board bodies sandwiching a spacer therebetween, with FIG. 7 being an exploded perspective illustration, and FIGS. 8-10 being assembled perspective illustrations of the second embodiment of the feather board apparatus viewed from various angles.
Figure 8:
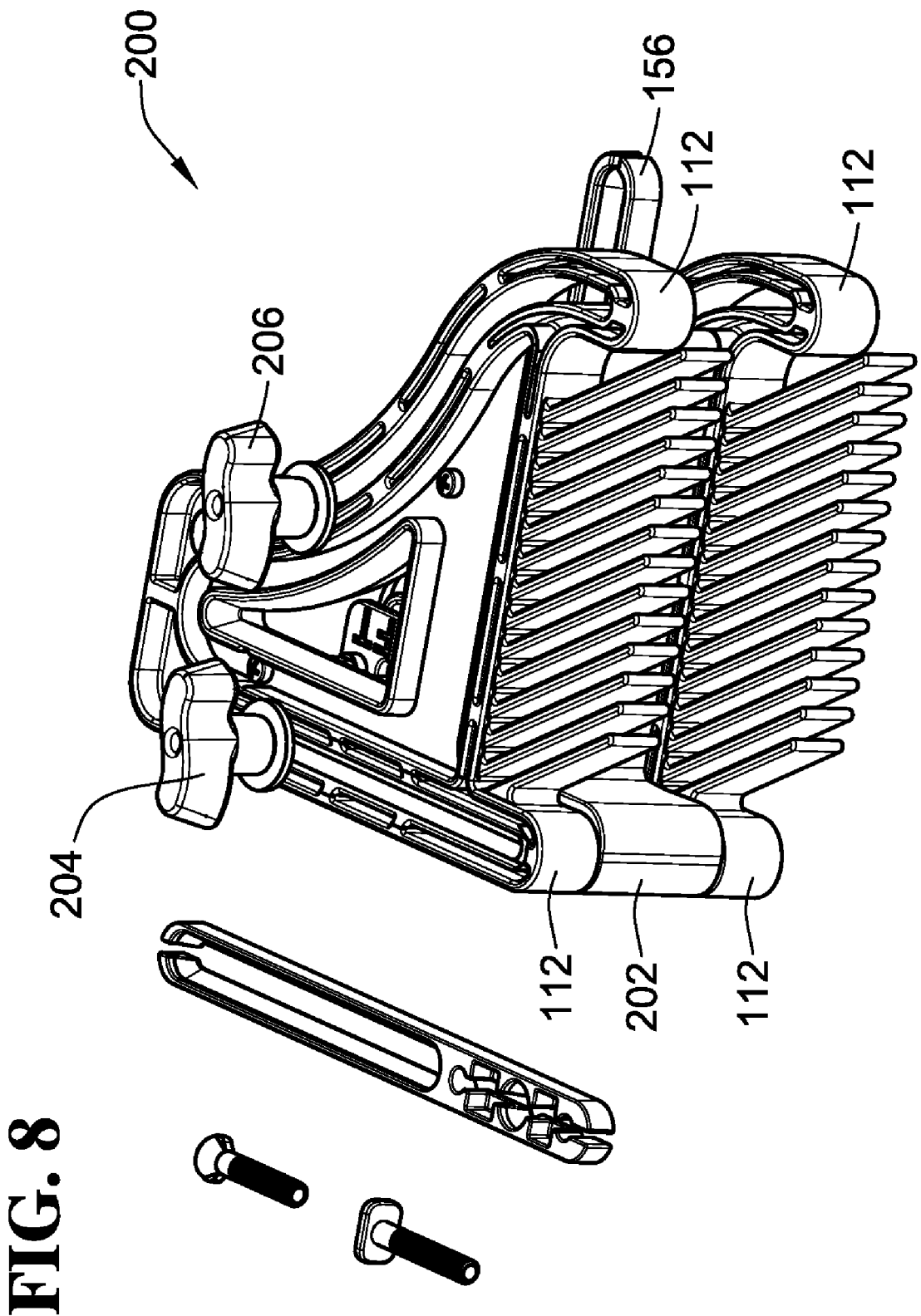
Figure 9:
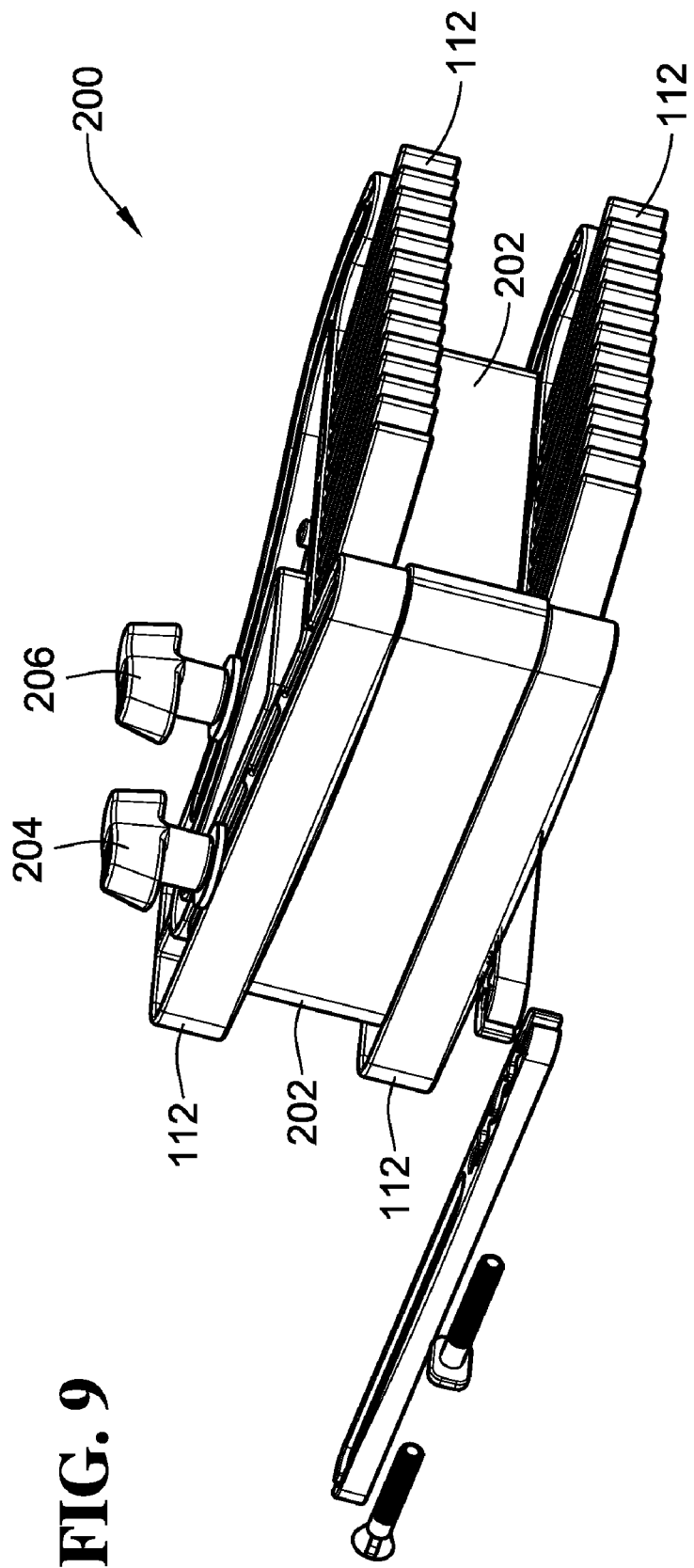
Figure 10:
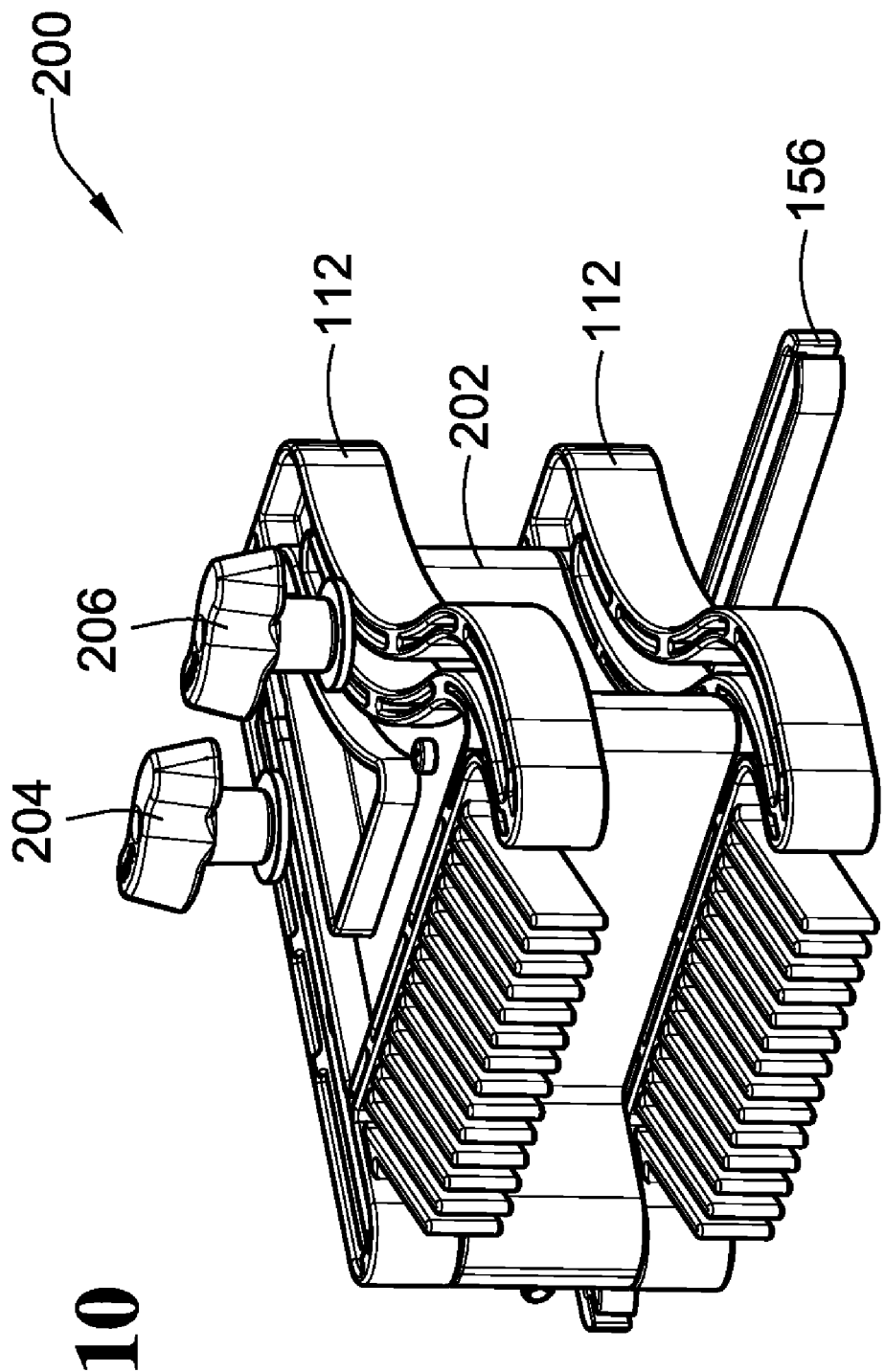

As best seen in FIG. 5, portions of the infeed slot 140 adjacent the first and second faces 118, 120 of the feather board body 112 are beveled inward, whereas the outfeed slot 142 does not include similar beveling adjacent the first and second surfaces 118, 120. As a result of the beveling of the infeed slot, mating surfaces of the feather board body 112 with the washer 152 and a portion of the slot bar 156 (see FIG. 4) have a smaller area of operative contact along the infeed slot 140 of the feather board body 112 than the corresponding areas of contact along the outfeed slot with the washer 154 and a portion of the slot bar 156 adjacent the outfeed slot 142. Because the contact area is reduced along the infeed slot 140, the clamping pressure exerted by the knob 148 of the infeed side clamping arrangement 112 is higher than the clamping pressure exerted by the outfeed side clamping arrangement 114 for an equal amount of torque being applied to the infeed and outfeed side clamping knobs 148, 150. As a result of this configuration, the outfeed side clamping pressure is limited to a value that is lower than the infeed side clamping pressure, with the same amount of torque being applied to the infeed and outfeed clamping knobs 148, 150, to thereby provide a limited amount of slippage at the outfeed clamping point as the work piece 110 is fed through the clearance 136 between the clamping plane 134 of the feather board apparatus 100 and the guide surface 104, which in turn allows for a limited amount of pivoting of the feather board body 112 about the infeed side clamping point 114, and thereby allow for a limited graduated reduction in clamping force applied to the work piece 110 by the fingers 130 of the feather board body 112 in a direction from the infeed side 124 to the outfeed side 126 of the feather board body 112 along the clamping plane 134. Those having skill in the art will readily recognize that providing this limited pivoting movement of the feather board body 112 constitutes considerable advantage and advancement over prior feather boards and methods for their use, in which the driving force required to push the work piece 110 past the fingers of the feather board can become objectionably high.

FIGS. 7-10 illustrate a second exemplary embodiment of a feather board apparatus 200, according to the invention, which includes several of the components of the first exemplary embodiment 100 described above, together with some additional components. Where practical, the same reference numerals used above in describing the first exemplary embodiment of the feather board apparatus 100 will be used in the description below of the second exemplary embodiment of the feather board apparatus 200.

In general, the second exemplary embodiment of a feather board apparatus 200, according to the invention, includes a pair of feather board bodies 112 similar to those described above, and a spacer 202 adapted for being sandwiched between the two feather board bodies 112 to create a taller feather board apparatus for use with work pieces having a height greater than one of the individual feather board bodies 112. The second exemplary embodiment of the feather board apparatus 200 also includes an infeed side clamping arrangement 204 and an outfeed side clamping arrangement 206 which are essentially identical to the infeed and outfeed side clamping arrangements 114, 116 of the first exemplary embodiment 100, except that the infeed and outfeed clamping bolts 144, 146 of the first exemplary embodiment are replaced with a pair of corresponding infeed and outfeed clamping bolts 204, 206 in the second exemplary embodiment 200 which have a length sufficient to extend through the combined length of the slot bar 156, the two feather board bodies 112, the spacer 202 and the washers 152, 154 and into threaded engagement with the infeed and outfeed clamping knobs 148, 150.

It is also contemplated, that, in some embodiments of the invention, the spacer 202 of the second exemplary embodiment of the feather board apparatus 200 may be eliminated, and two or more of the feather board bodies 112 be clamped directly on to of one another to provide support for a work piece having a thickness greater than one of the feather board bodies 112, but not necessarily tall enough to warrant the use of the spacer 202.

As best seen in FIG. 3, the infeed and outfeed clamping knobs 148, 150 of the exemplary embodiments 100, 200 of the invention described herein are both configured for applying torque in a tightening and un-tightening direction about an axis substantially defined by the centerlines of the infeed and outfeed clamping bolts 144, 146. Specifically, in the exemplary embodiments described herein, the infeed and outfeed clamping bolts 146, 148, are configured to include standard right-handed threads for engagement with the infeed and outfeed clamping knobs 148, 150 in such a manner that as the knobs 148, 150 are turned in a clockwise direction, as depicted in FIG. 3, the knobs are tightened, and conversely, as the knobs 148, 150 are turned in the counter-clockwise direction, as shown in FIG. 3, the juncture between the knobs 148 and 150 and their respective bolts 144, 146 are un-tightened.

It will be noted, that the infeed and outfeed clamping knobs 148, 150 have a substantially S-shaped profile with respect to the clockwise tightening direction, and a substantially reverse S-shaped profile with respect to the counter-clockwise un-tightening direction. By virtue of this arrangement, a slight ergonomic advantage is provided in the un-tightening direction, to thus preclude having the infeed and outfeed clamping knobs 148, 150 being tightened to a point that they are difficult to un-tighten.

It will be understood by those having skill in the art that the terms "table" and "guide surface" as used herein for describing the exemplary embodiments, and in the claims, are not intended to limit the invention to a particular combination or orientation of these features. It is expressly contemplated by the inventors that these terms are essentially interchangeable in various embodiments and applications of the invention, and that some embodiments may have other combinations of elements or features which provide structure and/or functionality substantially similar to the table and guide surface of the exemplary embodiments described herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A feather board apparatus, for holding a work piece against a guide surface as the work piece is guided along in a feed direction and for precluding motion of the work piece in a direction opposite the feed direction, the apparatus comprising:
   a feather board body, an infeed side feather board clamping arrangement, and an outfeed side feather board clamping arrangement;
   the feather board body defining first and second faces thereof, a longitudinal axis thereof, infeed and outfeed sides thereof disposed on opposite sides of the longitudinal axis, and a transverse edge thereof connecting the first and second faces and extending substantially perpendicularly to the longitudinal axis;

the feather board body also defining a plurality of fingers extending at an angle from the transverse edge, with each finger having a distal end thereof configured for sliding contact with the work piece, and the distal ends of the plurality of fingers being adapted for contacting and defining a clamping plane of the feather board body extending substantially along the feed direction and spaced a desired clearance distance from the guide surface when the feather board apparatus is mounted adjacent the guide surface, to thereby form a desired clearance between the clamping plane of the feather board body and the guide surface for passage therethrough of the work piece;

the infeed side feather board clamping arrangement being configured for applying an infeed side clamping pressure at an infeed side clamp point for retaining the infeed side of the feather board apparatus at the clearance distance from the guide surface, and the outfeed side feather board clamping arrangement being configured for applying an outfeed side clamping pressure at an outfeed side clamp point for retaining the outfeed side of the feather board apparatus at the clearance distance from the guide surface;

the infeed side and outfeed side feather board clamping arrangements being cooperatively configured for limiting the outfeed side clamping pressure to a value that is lower than the infeed side clamping pressure, to provide a limited amount of slippage at the outfeed clamping point as the work piece is fed through the clearance between the contact plane of the feather board apparatus and the guide surface with an accompanying limited amount of pivoting of the feather board apparatus about the infeed side clamping point, and thereby allow for a limited reduction in clamping pressure applied to the work piece by the clamping plane of the feather board body.

2. The apparatus of claim 1, wherein:

the body of the feather board defines a pair of slots extending therethrough from the first to the second faces of the body, with one of the slots disposed on the infeed side and forming part of the infeed side clamping arrangement and the other slot being disposed on the outfeed side and forming part of the outfeed side feather board clamping arrangement; and the infeed and outfeed side clamping arrangements each include a respective clamping bolt extending through the slot and threadably engaging a respective infeed and outfeed clamping knob for converting a torque applied to the knob to the infeed or outfeed clamping pressure exerted at the infeed and outfeed clamping points;

the infeed side slot having a mating surface thereof adapted for receiving clamping pressure from the infeed knob and the outfeed side slot having a mating surface thereof adapted for receiving clamping pressure from the outfeed knob, with the mating surface of the infeed side slot having a smaller area of operative contact with the infeed knob than an area of operative contact between the mating surface of the outfeed side slot and the outfeed knob.

3. The apparatus of claim 2, wherein the knobs are configured for preferentially limiting the amount of torque applied in a tightening direction to less that the torque applied in the un-tightening direction.

4. The apparatus of claim 2, wherein the knobs have an S-shaped periphery.

5. The apparatus of claim 1, further comprising:
a second feather board adapted to be mounted on top of the first feather board.

6. The apparatus of claim 5, further comprising, a spacer configured to be sandwiched between the first and second feather boards.

7. The apparatus of claim 2, further comprising, a slot bar adapted for engagement with the clamping bolts and for being received in a guide slot running substantially parallel to the guide surface.

8. A feather board apparatus, for holding a work piece against a guide surface adjacent to a guide slot running substantially parallel to the guide surface as the work piece is guided along in a feed direction, and for precluding motion of the work piece in a direction opposite the feed direction, the apparatus comprising:

a feather board body, an infeed side feather board clamping arrangement, an outfeed side feather board clamping arrangement, and a slot bar operatively engaging the infeed side and outfeed side clamping arrangements and adapted for being received in the guide slot;

the feather board body defining first and second faces thereof, a longitudinal axis thereof, infeed and outfeed sides thereof disposed on opposite sides of the longitudinal axis, and a transverse edge thereof connecting the first and second faces and extending substantially perpendicularly to the longitudinal axis;

the feather board body also defining a plurality of fingers extending at an angle from the transverse edge, with each finger having a distal end thereof configured for sliding contact with the work piece, and the distal ends of the plurality of fingers being adapted for contacting and defining a clamping plane of the feather board body extending substantially along the feed direction and spaced a desired clearance distance from the guide surface when the feather board apparatus is mounted adjacent the guide surface, to thereby form a desired clearance between the clamping plane of the feather board body and the guide surface for passage therethrough of the work piece;

the infeed side feather board clamping arrangement being configured for applying an infeed side clamping pressure at an infeed side clamp point for retaining the infeed side of the feather board apparatus at the clearance distance from the guide surface, and the outfeed side feather board clamping arrangement being configured for applying an outfeed side clamping pressure at an outfeed side clamp point for retaining the outfeed side of the feather board apparatus at the clearance distance from the guide surface;

the infeed side and outfeed side feather board clamping arrangements being cooperatively configured for limiting the outfeed side clamping pressure to a value that is lower than the infeed side clamping pressure, to provide a limited amount of slippage at the outfeed clamping point as the work piece is fed through the clearance between the contact plane of the feather board apparatus and the guide surface with an accompanying limited amount of pivoting of the feather board apparatus about the infeed side clamping point and thereby allow for a limited reduction in clamping pressure applied to the work piece by the clamping plane of the feather board body;

the body of the feather board defining a pair of slots extending therethrough from the first to the second faces of the body, with one of the slots disposed on the infeed side and forming part of the infeed side clamping arrangement and the other slot being disposed on the outfeed side and forming part of the outfeed side feather board clamping arrangement;

the infeed and outfeed side clamping arrangements each including a respective clamping bolt extending through the slot and threadably engaging a respective infeed and outfeed clamping knob for converting a torque applied to the knob to the infeed or outfeed clamping pressure exerted at the infeed and outfeed clamping points;

the infeed side slot having a mating surface thereof adapted for receiving clamping pressure from the infeed knob and the outfeed side slot having a mating surface thereof adapted for receiving clamping pressure from the outfeed knob, with the mating surface of the infeed side slot having a smaller area of operative contact with the infeed knob than an area of operative contact between the mating surface of the oufeed side slot and the outfeed knob;

the slot bar at the infeed clamping point including a tapered clamping surface disposed about a corresponding tapered portion of the clamping bolt, such that, as the clamping bolt is placed in tension by the knob, the tapered surfaces interact with one another to expand the slot bar adjacent the infeed clamping point to wedge the slot bar into the guide slot.

9. The apparatus of claim 1, further comprising:

first and second feather board bodies adapted to be mounted one on top of the other and being secured to one another by the infeed and outfeed clamping arrangements;

the first and second feather board bodies each defining first and second faces thereof, a longitudinal axis thereof, infeed and outfeed sides thereof disposed on opposite sides of the longitudinal axis, and a transverse edge thereof connecting the first and second faces and extending substantially perpendicularly to the longitudinal axis;

the feather board bodies also each defining a plurality of fingers extending at an angle from the transverse edge, with each finger having a distal end thereof configured for sliding contact with the work piece, and the distal ends of the plurality of fingers being adapted for contacting and defining a clamping plane of the feather board body extending substantially along the feed direction and spaced a desired clearance distance from the guide surface when the feather board apparatus is mounted adjacent the guide surface with the first and second feather board bodies mounted one on top of the other and oriented such that their respective clamping planes are substantially aligned with one another, to thereby form a desired clearance between the clamping planes of the feather board bodies and the guide surface for passage therethrough of the work piece;

the infeed side feather board clamping arrangement being configured for applying an infeed side clamping pressure at an infeed side clamp point for retaining the infeed side of the feather board apparatus at the clearance distance from the guide surface, and the outfeed side feather board clamping arrangement being configured for applying an outfeed side clamping pressure at an outfeed side clamp point for retaining the outfeed side of the feather board apparatus at the clearance distance from the guide surface;

the infeed side and outfeed side feather board clamping arrangements being cooperatively configured for limiting the outfeed side clamping pressure to a value that is lower than the infeed side clamping pressure, to provide a limited amount of slippage at the outfeed clamping point as the work piece is fed through the clearance between the contact plane of the feather board apparatus and the guide surface with an accompanying limited amount of pivoting of the feather board apparatus about the infeed side clamping point, and thereby allow for a limited reduction in clamping pressure applied to the work piece by the clamping planes of the feather board bodies.

10. The apparatus of claim 9, wherein:

the bodies of the first and second feather boards each define a pair of slots extending therethrough from the first to the second faces of the body, with one of the slots disposed on the infeed side and forming part of the infeed side clamping arrangement and the other slot being disposed on the outfeed side and forming part of the outfeed side feather board clamping arrangement; and the infeed and outfeed side clamping arrangements each include a respective clamping bolt extending through the slots in the stacked first and second feather board bodies and threadably engaging a respective infeed and outfeed clamping knob for converting a torque applied to the knob to the infeed or outfeed clamping pressure exerted at the infeed and outfeed clamping points;

the infeed side slots of the first and second feather board bodies each having a mating surface thereof adapted for receiving clamping pressure from the infeed knob and the outfeed side slots of the first and second feather board bodies each having a mating surface thereof adapted for receiving clamping pressure from the outfeed knob, with the mating surface of the infeed side slot having a smaller area of operative contact with the infeed knob than an area of operative contact between the mating surface of the oufeed side slot and the outfeed knob.

11. The apparatus of claim 10, further comprising, a slot bar adapted for engagement with the clamping bolts and for being received in a guide slot running substantially parallel to the guide surface.

12. The apparatus of claim 11, wherein, the slot bar at the infeed clamping point includes a tapered clamping surface disposed about a corresponding tapered portion of the clamping bolt, such that, as the clamping bolt is placed in tension by the knob, the tapered surfaces interact with one another to expand the slot bar adjacent the infeed clamping point to wedge the slot bar into the guide slot.

13. The apparatus of claim 9, further comprising, a spacer configured to be sandwiched between the first and second feather board bodies, with the first and second feather board bodies and the spacer being secured to one another by the infeed and outfeed side feather board clamping arrangements.

14. The apparatus of claim 13, wherein:

the bodies of the first and second feather boards each define a pair of slots extending therethrough from the first to the second faces of the body, with one of the slots disposed on the infeed side and forming part of the infeed side clamping arrangement and the other slot being disposed on the outfeed side and forming part of the outfeed side feather board clamping arrangement; and the infeed and outfeed side clamping arrangements each include a respective clamping bolt extending through the slots in the stacked first and second feather board bodies and threadably engaging a respective infeed and outfeed clamping knob for converting a torque applied to the knob to the infeed or outfeed clamping pressure exerted at the infeed and outfeed clamping points;

the infeed side slots of the first and second feather board bodies each having a mating surface thereof adapted for receiving clamping pressure from the infeed knob and the outfeed side slots of the first and second feather board bodies each having a mating surface thereof adapted for receiving clamping pressure from the outfeed knob, with the mating surface of the infeed side slot having a smaller area of operative contact with the infeed knob than an area of operative contact between the mating surface of the oufeed side slot and the outfeed knob.

15. The apparatus of claim 14, further comprising, a slot bar adapted for engagement with the clamping bolts and for being received in a guide slot running substantially parallel to the guide surface.

16. The apparatus of claim 15, wherein, the slot bar at the infeed clamping point includes a tapered clamping surface disposed about a corresponding tapered portion of the clamping bolt, such that, as the clamping bolt is placed in tension by the knob, the tapered surfaces interact with one another to expand the slot bar adjacent the infeed clamping point to wedge the slot bar into the guide slot.

17. The apparatus of claim 8, wherein the knobs are configured for preferentially limiting the amount of torque applied in a tightening direction to less that the torque applied in the un-tightening direction.

18. The apparatus of claim 17, wherein, the knobs have an S-shaped periphery.

19. The apparatus of claim 17, wherein, at least one of the infeed side and outfeed side clamping arrangements comprises:

a threaded member defining a clamping axis of the clamping arrangement for applying a clamping force directed generally along the clamping axis; and a knob threadably engaging the threaded member for applying torque in a tightening and un-tightening direction about the axis to thereby increase and decrease clamping force respectively through the threaded engagement of the knob with the threaded member;

the knob having a substantially S-shaped profile with respect to the tightening direction and a substantially reverse S-shaped profile with respect to un-tightening direction when the tightening direction is clockwise with respect to the axis and the un-tightening direction is counterclockwise with respect to the axis; and the knob having a substantially reverse S-shaped profile with respect to the tightening direction and a substantially S-shaped profile with respect to un-tightening direction when the tightening direction is counter-clockwise with respect to the axis and the un-tightening direction is clockwise with respect to the axis.

20. The apparatus of claim 8, further comprising:

a second feather board adapted to be mounted between the first feather board the slot bar.

21. The apparatus of claim 20, further comprising, a spacer adapted for mounting between the first and second feather boards.

* * * * *